(12) United States Patent
Yeo

(10) Patent No.: US 6,434,256 B1
(45) Date of Patent: Aug. 13, 2002

(54) METHOD FOR MONITORING A POSITION OF VEHICLE IN A LANE OF A ROADWAY

(75) Inventor: Jung-Hack Yeo, Kyungki-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/364,294

(22) Filed: Jul. 30, 1999

(30) Foreign Application Priority Data

Mar. 11, 1999 (KR) .............................................. 99-8036

(51) Int. Cl.⁷ ................................................. G06K 9/00
(52) U.S. Cl. ..................................................... 382/104
(58) Field of Search .............................. 382/100, 103, 382/104, 194, 254, 260, 312; 340/901, 904, 905, 937, 942, 425.5, 435, 437; 701/1, 4, 8, 65, 80, 116, 117, 300, 301, 302; 700/80; 73/8

(56) References Cited

U.S. PATENT DOCUMENTS

| | | | |
|---|---|---|---|
| 5,642,093 A | * | 6/1997 | Kinoshita et al. ............ 340/439 |
| 5,689,249 A | * | 11/1997 | Sakamoto et al. ........... 340/901 |
| 5,774,569 A | * | 6/1998 | Waldenmaier ............... 382/100 |
| 5,892,855 A | * | 4/1999 | Kakinami et al. ........... 382/291 |
| 6,037,975 A | * | 3/2000 | Aoyama ...................... 348/113 |
| 6,057,754 A | * | 5/2000 | Kinoshita et al. ............ 340/435 |
| 6,091,833 A | * | 7/2000 | Yasui et al. .................. 382/104 |
| 6,138,084 A | * | 10/2000 | Mine ........................... 702/157 |
| 6,282,478 B1 | * | 8/2001 | Akita ............................ 701/70 |
| 6,172,600 B1 | * | 1/2002 | Kakinami et al. ........... 340/435 |

* cited by examiner

*Primary Examiner*—Andrew W. Johns
*Assistant Examiner*—Shervin Nakhjavan
(74) *Attorney, Agent, or Firm*—Birch, Stewart, Kolasch & Birch, LLP

(57) ABSTRACT

A method for monitoring a position of a vehicle in a lane of a roadway. An image signal of a lane is first input from a camera, then noise of the image signal is eliminated. The image signal is divided into a plurality of image frames having different resolutions, and a lane border is extracted by processing the image frames. A road is modeled using the lane border, and an actual road width is calculated according to a distance between pixels on an image coordinate using a camera parameter calculated in accordance with a position of a camera. Then it is determined If the vehicle is moving out of the lane or not; and an alarm is produced when the vehicle is moving out of the lane.

3 Claims, 4 Drawing Sheets

32×32

64×64

128×128

256×256

METHOD FOR MONITORING A POSITION OF VEHICLE IN A LANE OF A ROADWAY

BACKGROUND OF THE INVENTION (a) Field of the Invention

The present invention relates to a method for monitoring a position of a vehicle in a lane of a roadway and warning the driver when the vehicle is moving out of the lane.

(b) Description of the Related Art

FIG. 1 shows a conventional device for monitoring a position of a vehicle in a lane of a roadway.

The conventional device comprises a CCD camera for taking a picture of a lane of a roadway and outputting image signals corresponding to the picture taken, an electronic control unit (ECU) receiving the image signals from the CCD camera and processing the signals according to a preset logic to determine if the vehicle is moving out of the lane, and an alarming device for outputting an alarm signal in accordance with signals transmitted from the ECU.

In such vehicle position monitoring technology, it is absolutely essential that the alarm signal is output in rear-time when the vehicle is moving out of the lane. Dire consequences may result from a delayed alarm signal. However, as is well known, since image signal data are usually large-scaled, powerful computing ability is required to process image signal data in real-time. This of course, leads to problems of high cost.

Accordingly, in the conventional device, a method in which the resolution of the image is lowered has been used. However, if the resolution of the image is too low, the device may not accurately determine the position of the vehicle in the lane. That is, the CPU may miscalculate and erroneously determine normal driving of the vehicle or straying of the vehicle out of the lane.

SUMMARY OF THE INVENTION

The present invention has been made in an effort to solve the above problems.

It is an objective of the present invention to provide a method for monitoring a position of a vehicle in a lane of a roadway and alerting the driver in real-time when the vehicle is moving out of the lane, thereby providing additional safety to the driver.

To achieve the above objective, the present invention provides a method for monitoring a position of a vehicle in a lane of a roadway. The method comprises the steps of inputting an image signal of a lane from a camera, eliminating noise of the image signal, dividing the image signal into a plurality of image frames having different resolutions, extracting a lane border by processing the image frames, modeling a road using the lane border, calculating an actual road width according to a distance between pixels on an image coordinate using a camera parameter calculated in accordance with a position of a camera, determining if the vehicle is moving out of the lane or not, and producing an alarm when the vehicle is moving out of the lane.

The step of dividing the image signal further comprises the steps of reducing the number of pixels of the image signal received from the camera to obtain the plurality of image frames, each having different numbers of pixels, and storing the plurality of image frames into a memory.

The step of extracting the lane border is conducted by processing the image frames, the image frames being processed in order of resolution from lowest to highest until a reliable lane border is extracted.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

A preferred embodiment of the present invention will now be described in detail with reference to the accompanying drawings.

Figure 1:
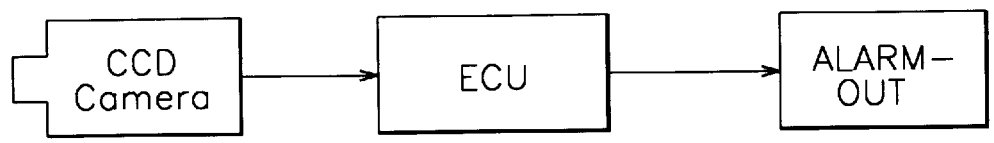
FIG. 1 is a block diagram of a conventional device for monitoring a position of a vehicle in a lane of a roadway.
Figure 2:
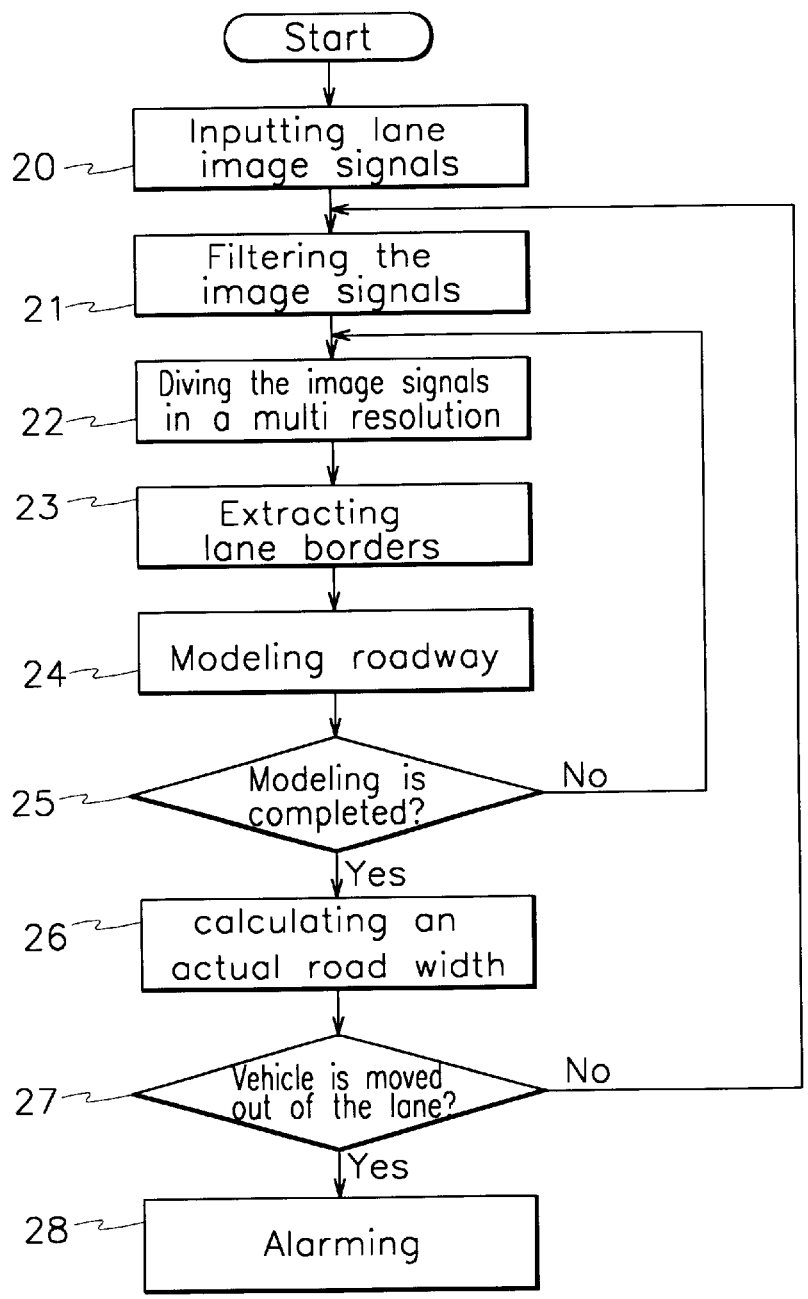
FIG. 2 is a flow chart of a method for monitoring a position of a vehicle in a lane of a roadway according to a preferred embodiment of the present invention.

Referring first to FIG. 2, shown is a flow chart illustrating a method for monitoring a position of a vehicle in a lane of a roadway according to a preferred embodiment of the present invention.

In step 20, an image signal of a lane is first input from a camera. Noise of the image signal is filtered in step 21. The image signal is divided into a plurality of image frames having different resolutions by reducing the number of pixels of the image in step 22.

Lane borders are extracted using the multi-resolution image frames in step 23, then a road modeling process is conducted using the lane borders in step 24. In step 25, it is determined whether the road modeling is completed or not.

Next, in step 26, if the road modeling is completed, using a camera parameter calculated in accordance with a position of the camera is used and an actual road width is calculated according to a distance between the pixels on an image coordinate. In step 27, using the actual road width, it is determined whether the vehicle is out of the lane. If the vehicle is out of the lane, an alarm device is operated in step 28.

Figure 3:
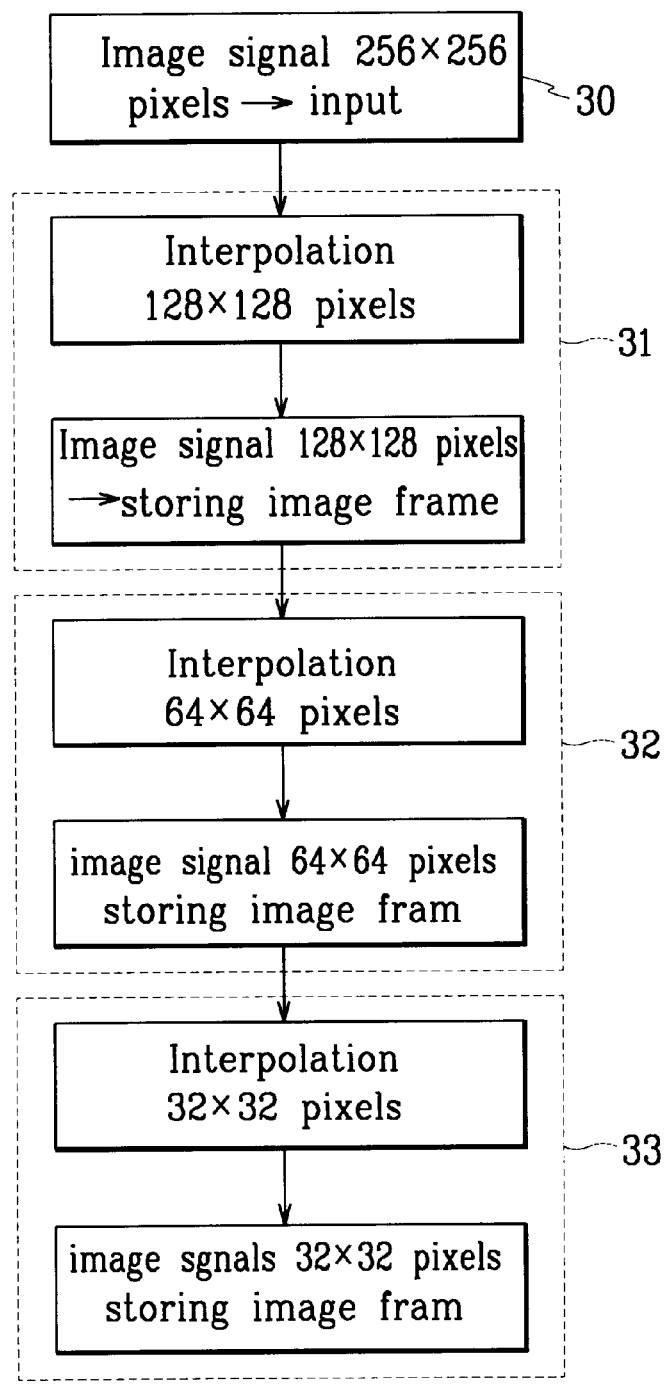
FIG. 3 is a flow chart of a process for dividing image signals into a plurality of image frames according to a preferred embodiment of the present invention.

FIG. 3 shows a flow chart illustrating a method for dividing the image into a plurality of multi-resolution frames.

In step 30, a high-resolution image signal having 256×256 pixels is input from the camera after the noise is eliminated. In step 31, the 256×256 pixels are interpolated to 128×128 pixels, then the interpolated pixels are stored in an image memory. In step 32, the 128×128 pixels are further interpolated to 64×64 pixels, then stored in the image memory. In step 33, the 64×64 pixels are further interpolated to 32×32 pixels, then stored in the image memory.

Figure 4:
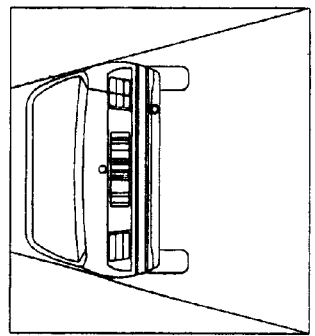
FIG. 4 is a view illustrating variations of an image according to the multi-resolution dividing process.
Figure 4:
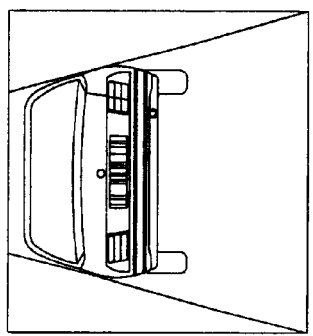
Figure 4:
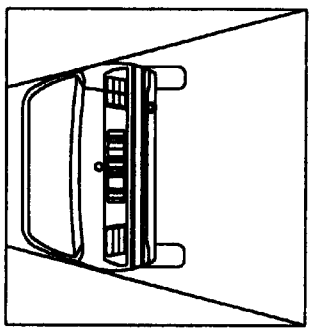
Figure 4:
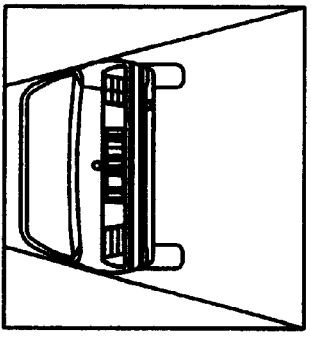

FIG. 4 shows image frames according to the image resolution dividing process.

Therefore, when extracting the lane borders in step 23 of FIG. 2, the lane borders are first extracted using the image having the 32×32 pixels so as to reduce the processing time. At this time, if the extracted lane borders are not reliable, the lane borders are extracted using the image having the 64×64 pixels. If the extracted borders are still not reliable, the lane borders are extracted using the image having the 128×128 pixels.

As is well known the lower the number of the pixels, the smaller the size of the data. Accordingly, in the present invention, since the image is processed starting from the lower resolution images then progressively to the higher resolution images until a reliable lane borders are extracted, process times can be drastically reduced, making rear-time processing of the images possible.

Using the image that is processed in real time, The ECU conducts its road modeling process using the image that is processed in real time in step 24. In step 25, it is determined whether the modeling process is completed or not.

If the modeling process is completed, in step 26, to extract the actual road width from 2-dimensional coordinates with respect to the image signals transmitted from the camera, a distance between the pixels on the image coordinate is calculated using a camera parameter calculated in accordance with an initial camera position, thereby obtaining the actual road width.

As described above, when the actual road width is obtained, it is determined whether or not the vehicle is moving out of the lane with respect to the actual road width in step 27.

If the vehicle is out of the lane, in step 28, the ECU operates the alarm device in step 28.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method for monitoring a position of a vehicle in a lane of a roadway, comprising the steps of:
   inputting an image signal of a lane from a camera;
   eliminating noise of the image signal;
   dividing the image signal into a plurality of image frames having different resolutions;
   extracting a lane border by processing the image frames;
   modeling a road using the lane border;
   calculating an actual road width according to a distance between pixels on an image coordinate using a camera parameter calculated in accordance with a position of a camera;
   determining if the vehicle is moving out of the lane or not; and
   producing an alarm when the vehicle is moving out of the lane.

2. The method of claim 1 wherein the step of dividing the image signal further comprises the steps of reducing the number of pixels of the image signal received from the camera to obtain the plurality of image frames, each having different numbers of pixels, and storing the plurality of image frames into a memory.

3. The method of claim 2 wherein the step of extracting the lane border is conducted by processing the image frames, the image frames being processed in order of resolution from lowest to highest until a reliable lane border is extracted.

* * * * *